United States Patent [19]

Martig, Jr.

[11] 4,034,607

[45] July 12, 1977

[54] FLOW MONITORING

[75] Inventor: Kenneth W. Martig, Jr., Olympia, Wash.

[73] Assignee: Pro-Tech Inc., Paoli, Pa.

[21] Appl. No.: 700,394

[22] Filed: June 28, 1976

Related U.S. Application Data

[63] Continuation-in-part of Ser. No. 503,392, Sept. 5, 1974, Pat. No. 3,965,740.

[51] Int. Cl.² .......................................... G01F 1/20
[52] U.S. Cl. .................................... 73/215; 73/302
[58] Field of Search ................ 73/194 R, 215, 216, 73/299, 302

[56] References Cited

U.S. PATENT DOCUMENTS

| 181,135 | 8/1876 | Brady et al. | 138/94.5 |
|---|---|---|---|
| 3,301,050 | 1/1967 | McNulty | 73/215 |
| 3,475,959 | 11/1969 | Glassey | 73/302 X |
| 3,638,490 | 2/1972 | Buettner | 73/194 R |

FOREIGN PATENT DOCUMENTS 2,424,454  11/1975  Germany .............................. 73/215

OTHER PUBLICATIONS

J. B. Shah, "Simple Method for Wastewater Flow Measurement" Jour. Water Poll. Control Fed., Vol. 45, No. 5, May 1973, pp. 932–935.

Primary Examiner—Charles A. Ruehl

[57] ABSTRACT

A probe adapted to fit in an open end of a sewer or water conduit is provided with a weir plate and with a bubble tube for sensing the depth of flow over the weir plate and, thus, determining the flow rate. A V-notch weir plate is made up of two like pieces flexibly joined at their apex, thereby enabling the probe to be compressed for ease of insertion into the open end and to be expanded therewithin for frictional retention against the inside wall of the conduit, to which the probe conforms. Except for the weir plate itself all parts of the probe lie along the wall for minimum disturbance of the flow.

8 Claims, 7 Drawing Figures

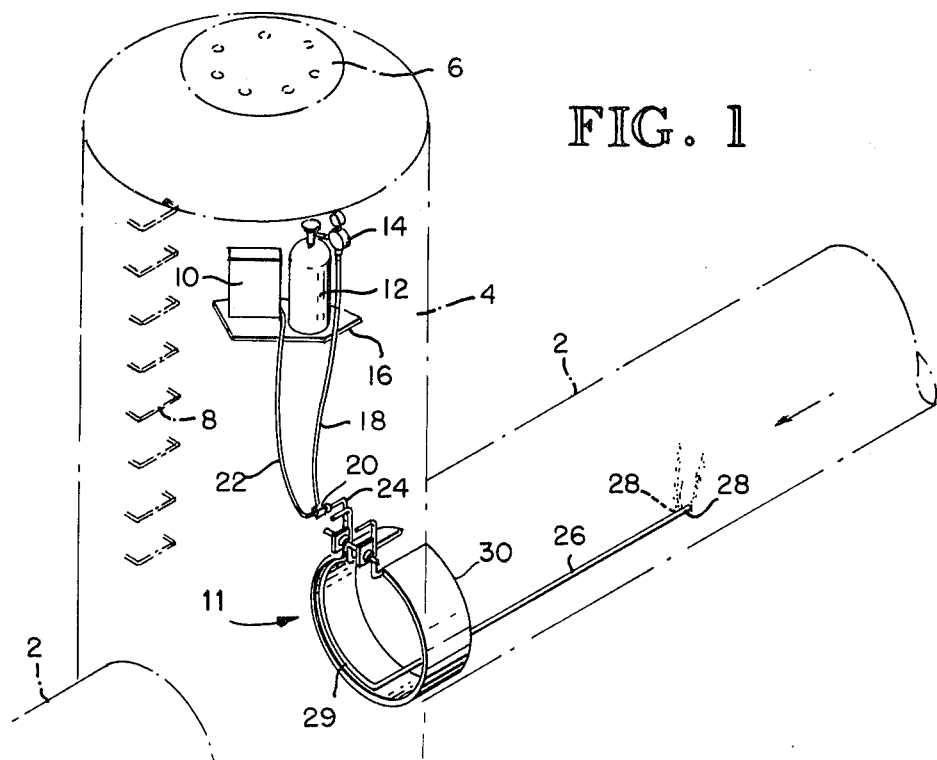
FIG. 1
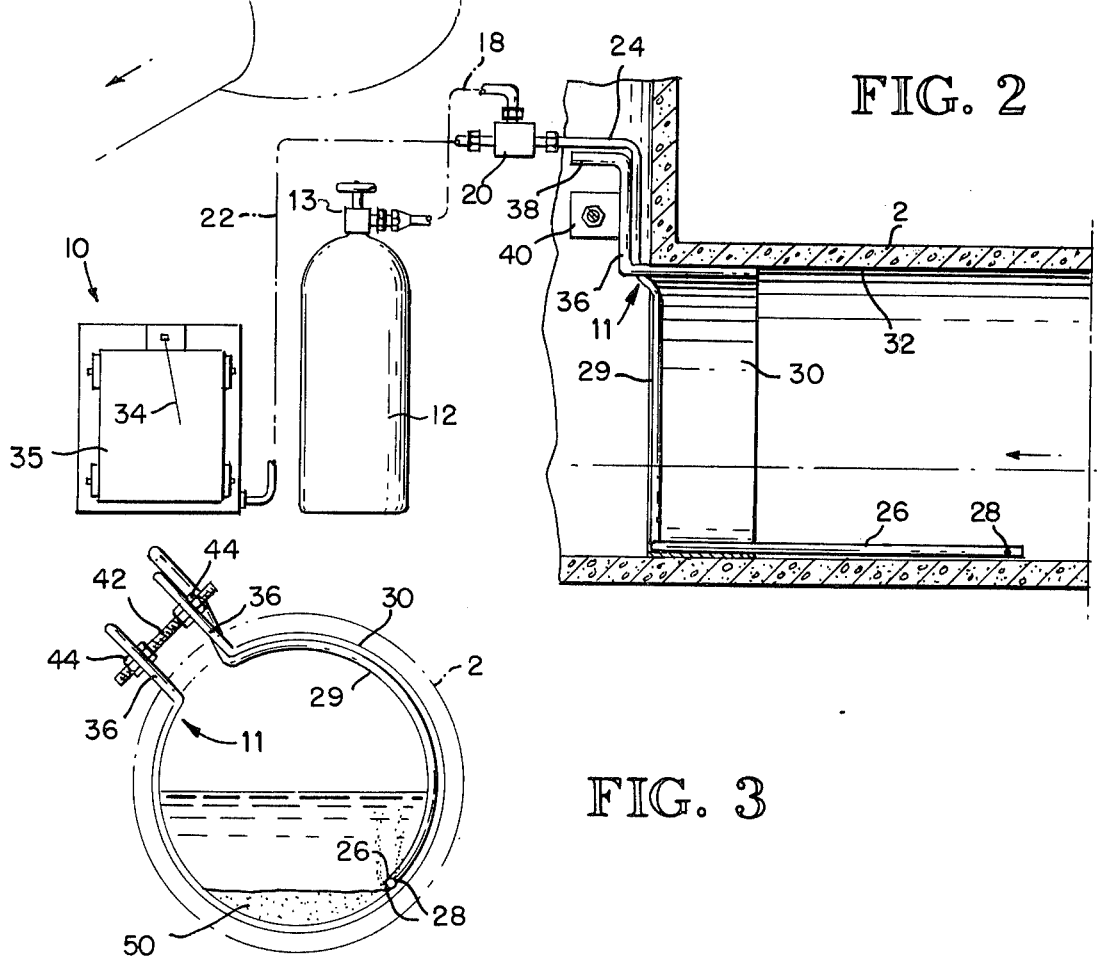
FIG. 2
FIG. 3

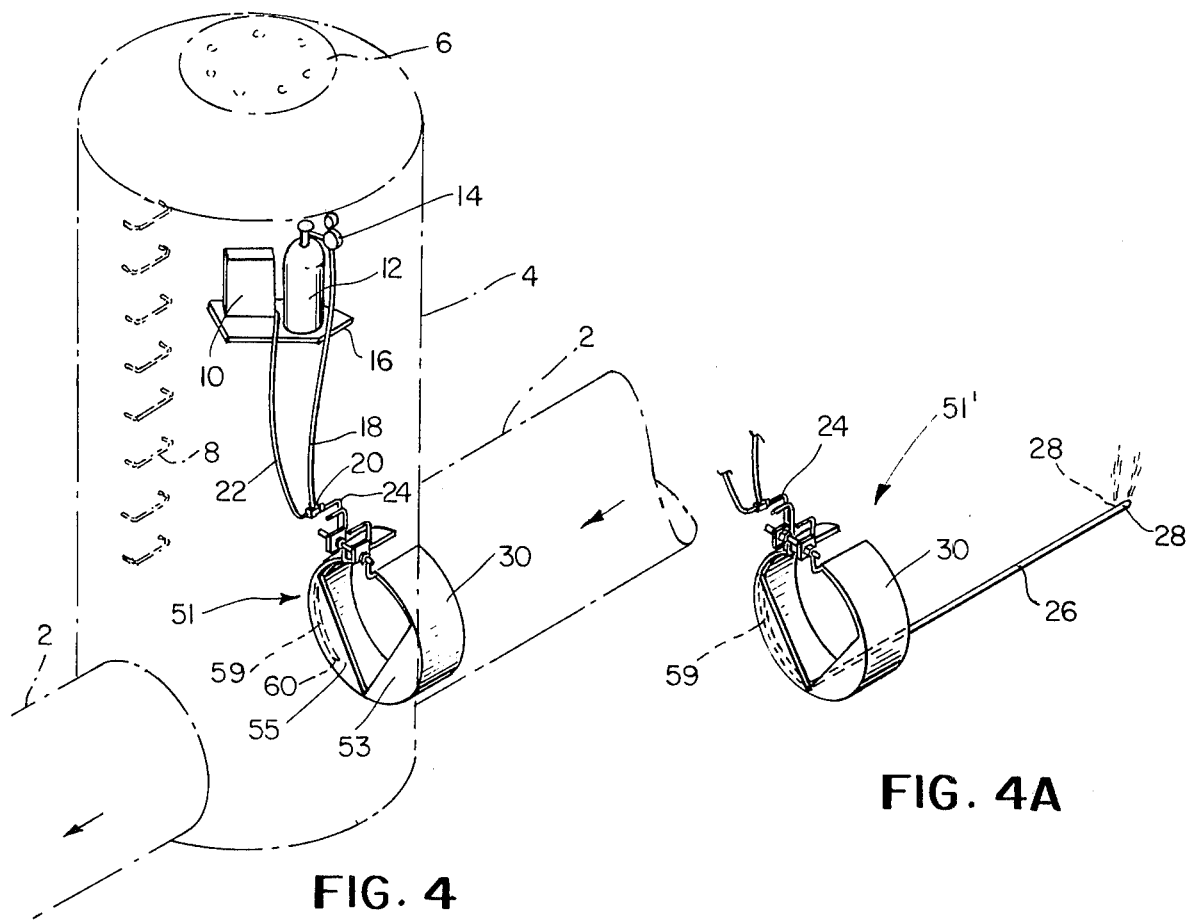
FIG. 4
FIG. 4A
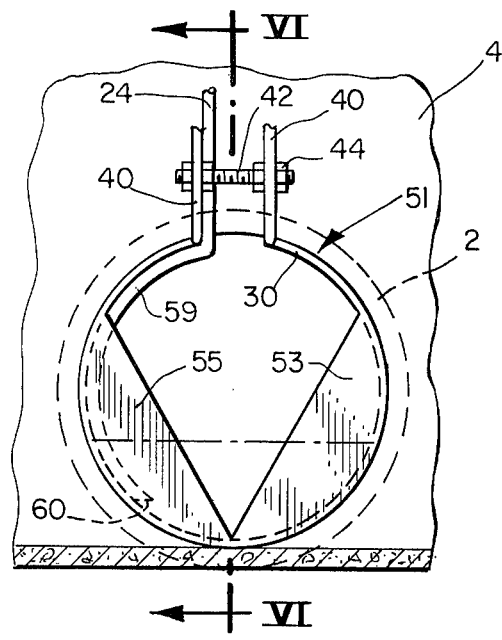
FIG. 5
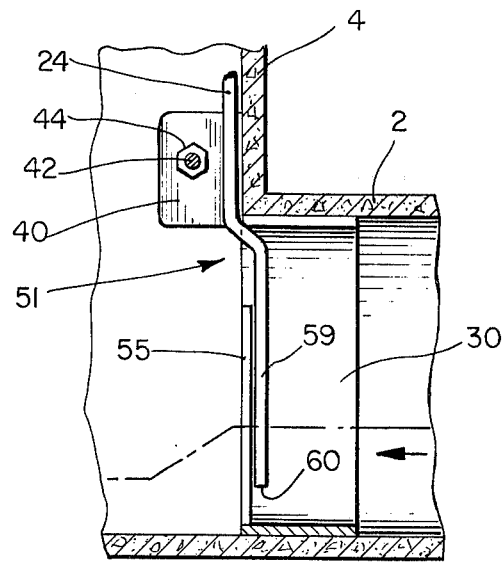
FIG. 6

FLOW MONITORING

This application is a continuation-in-part of copending application, Ser. No. 503,392 filed Sept. 5, 1974 and scheduled to issue on June 29, 1976 as U.S. Pat. No. 3,965,740.

This invention relates to monitoring of flow in open conduits such as sewers or drainage waterpipes.

It has always been important to design a sewage flow system to accommodate the maximum demand. This has been accomplished with consistent success when a stable demand has been predictable. In the past raw sewage usually has been combined with natural drainage, and the combined drainage system has included drain pipes or conduits larger than the predicted normal flow with the object of accommodating all flows at all times so that the line would not be overloaded or would not back up under times of unexpected demand. With the increased interest and concern for the environment and health of expanding populations it is becoming more important to channel raw sewage into one sewer system for proper treatment prior to discharge, and the natural drainage or storm sewage and ground water into another system that, because of its lack of contaminants, may be discharged with little or no preliminary treatment.

For reasons of efficiency, as well as best usage of treatment facilities, it is imperative that the system for handling raw sewage handle nothing more than raw sewage. The raw sewage can be fed into a sewage treatment plant without overloading the facility, thereby minimizing the environmental danger. Such segregation is a prime reason that those systems intended to handle raw sewage must be monitored to record any unpredicted increase in demand resulting from storm inflow or ground water infiltration or surface drainage into the system, or alternatively, release of raw sewage to the surrounding environment.

One means for determining the flow within an open conduit is through the use of the Manning flow relationship wherein if the pipe size is known, the slope of the pipe or conduit, and the surface condition of the conduit as well as the recorded depth, then by use of the Manning formula the flow can be determined. Accuracy of the flow computation is limited by the limits within which the slope and surface condition are known and by any departure of the slope of the flow surface from such slope, as during any flow increase or decrease.

Flow monitoring based upon depth of flow elsewhere, such as in a manhole, is at a disadvantage because of the customary flow disturbances induced as the stream leaves the conduit and enters the manhole enclosure. Moreover, methods of depth determination based upon surface sensing, whether mechanically, sonically, or otherwise, are affected adversely not only by flow turbulence but also by any debris floating on the surface. Surface-sensing methods, wherever performed, are subject to substantial error whenever sludge underlies the flow stream.

Especially where the flow depth is relatively small compared with the conduit diameter or equivalent dimension, the accuracy of flow computation based upon depth can be improved by insertion of a device, such as a weir or flume, that produces known changes in depth at known flow rates. Installation of such devices is usually expensive and time-consuming, especially if the flow is uninterrupted, and subsequent removal as for necessary cleaning is similarly troublesome.

Accordingly, a primary object of the present invention is to provide a portable means whereby the flow within a regular open conduit may be determined readily and reasonably accurately without great cost, and further with far greater facility than heretofore possible.

Another object of this invention is to provide a method whereby the depth within an open channel may be continuously recorded without requiring full-time operator surveillance.

A further object of the invention is to provide a novel weir apparatus for readily measuring the depth of flow in an open channel, thus enabling the rate of flow within the channel to be accurately determined.

Other objects of the present invention, together with means and methods for attaining the various objects, will be apparent from the following description and the accompanying diagrams.

FIG. 1 is an environmental view showing flow-monitoring apparatus including a pressure recorder and a pressurized fluid supply tank located suitably within a manhole of a sewer system and a sensing probe located within a conduit opening into the manhole (both shown in phantom).

FIG. 2 is a partially schematic view, illustrating the probe in side elevation in the conduit, partly sectioned away, and its interconnection with the supply tank and the recorder but with the latter two components displaced from their FIG. 1 location in the interest of clarity.

FIG. 3 is an end elevation of the probe of FIGS. 1 and 2 shown rotatively displaced in the conduit to accommodate substantial sludge in the bottom of the conduit.

FIG. 4 is a perspective view of an embodiment of weir-plate probe of this invention installed similarly to the probe of FIG. 1.

FIG. 4a is a like view of a modification of the embodiment of FIG. 4, including a bubble tube like that shown in FIG. 1.

FIG. 5 is an end elevation of the probe of FIG. 4 from within the manhole looking upstream into the open end of the conduit.

FIG. 6 is a side elevation taken along VI—VI of FIG. 5.

In general, the objects of the present invention are accomplished, in apparatus for measuring flow in a conduit, by support means configured to conform to the inside wall of the conduit and adapted to be compressed thereinto and to be expanded against the inside wall thereof, adjustment means for expanding the support means against the inside wall of the conduit, and weir means supported by the support means, especially including a bubble tube supported by the support means along a conforming edge thereof and thereby adapted to lie adjacent the inside wall of the conduit.

The invention extends to the combination of means for supplying sensing fluid under pressure, a flow probe comprising support means configured to fit within the conduit, and a supported bubble tube configured to lie along the inside wall of the conduit and adapted to be connected to the fluid supply means, the probe also including a V-notch weir plate supported by the support means. More particularly, the weir plate of the probe comprises a pair of like pieces, each such piece being contiguous along one of its edges with the conforming edge of the support means, and both such pieces being contiguous with one another at one end of each, thereby forming the apex of the V-notch, the included angle at such apex being variable but adapted to be set by the adjustment means.

FIG. 1 shows, in perspective, recorder 10 and supply tank 12 of pressurized fluid on shelf 16, located in manhole 4 (shown in phantom) with cover 6 on top and ladder 8 leading down thereinto, and sensing probe 11 fitting within the open end of the upstream portion of conduit 2 (also shown in phantom), the flow direction in both the upstream and downstream portions of the conduit being indicated by arrows. It will be understood that the flow stream (not shown) may be channeled through the manhole to a greater or lesser extent, but no attempt is made to illustrate such channeling.

Also visible in FIG. 1 are pressurized fluid-conducting tubing 18 between flow regulator 14 from supply tank 12 and the base of T-connection 20 (shown inverted), also similar fluid-conducting tubing 22 from the other arm of the T-connection to recorder 10. Tubing 24 leads from the other arm of the T-connection to arcuate tubing 29 supported along a similarly configured edge of supporting flexible collar 30 of probe 11. At the lowermost part of the curved edge, the arcuate tubing interconnects with bubble tube 26, which extends preferably upstream (or alternatively, downstream where upstream access is not feasible) along the flow base in the cradle or invert of the conduit. At the furthermost end of bubble tube 26, it has lateral openings 28, 28 (both sides) from its longitudinal bore to the exterior within the conduit, and bubbles are shown schematically rising therefrom. FIG. 2 shows from the side, somewhat enlarged, the principal components of the preceding view, with some of their interconnection indicated diagramatically. Recorder 10 is shown with pen 34 overlying chart 35. Valve 13 on top of pressurized fluid supply tank 12 appears more clearly. Parts of probe 11 shown in greater detail include, in addition to those already mentioned, radially extending handles 36 (one visible here; see the preceding and subsequent views for the other), each with axially extending grip 38. The dot-dashed broken line indicates a possible level of the stream in the conduit.

FIG. 3 shows probe 11 from the end, on the same scale as FIG. 2, but rotated somewhat about the axis of the conduit, with which the axis of collar 30 is coincident, to raise bubble tube 26 to the upper surface of layer 50 of sludge in the conduit. Brackets 40 on handles 36 are clearly shown with interconnecting bolt 42 and nuts 44 threaded thereonto on both sides of both brackets, thereby constituting means for adjusting the separation between the ends of collar 30 and, therefore, its diameter as well.

It will be understood that, in practice, the sensing probe is compressed in diameter manually, then is inserted into the open end of the conduit, and finally is expanded against the inside wall of the conduit by increasing the separation of the brackets through appropriate rotation of the nuts on the adjusting bolt. Friction between the probe collar and the conduit wall retains the probe in place, and the collar width is great enough to align the probe with the conduit so that the bubble tube extends upstream parallel to the conduit axis.

Both the bubble tube and the supporting collar itself are configured to lie so close to the zero-velocity interface between the conduit wall and the stream that their interference with the flow is practically nil. Discharge of the pressurized fluid laterally from the bubble tube renders the back pressure applied thereto by the overlying stream essentially the static head pressure only, relatively independent of flow velocity. The presence of two lateral discharge ports is a deterrent to clogging. Of course, the probe can be removed for cleaning, if and as desired, in a minute or two and then can be replaced as simply. No special materials of construction are required, but stainless steel is a good choice, being desirably inert to practically any stream component or contaminant, and structurally strong, with a desirable degree of flexibility, although somewhat more difficult to fabricate than some less suitable materials.

FIG. 4 shows, in perspective similarly to FIG. 1, sensing probe 51, which closely resembles probe 11 except as noted below, like parts being designated by unchanged reference numerals. FIG. 4a shows in perspective a probe modification (designated as 51:) identical with probe 51 of FIG. 4 except for including upstream extending bubble tube 26—like that of probe 11 of FIG. 1—which is omitted from the embodiment of FIGS. 4, 5, and 6. FIGS. 5 and 6 shown this latter probe embodiment in end and side elevation, respectively.

In this probe, flexible supporting collar 30 has affixed thereto along its downstream edge, at the right and left, respectively, segment-shaped weir pieces 53 and 55. The weir pieces are mutually contiguous only at the midpoint of that edge, shown located lowermost, forming a V-notch apex thereat with an included angle of 60L in the illustrated embodiment. The resulting weir plate terminates at the collar at a level about three-fourths of the conduit diameter above the bottom.

When (as in FIGS. 4, 5, and 6) bubble tube 26 is deleted, arcuate tubing 59 (similar to tubing 29 in FIG. 1) opens downward at the end of its base, instead of laterally as in tube 26. Opening 60 at the end of tubing 59 is located preferably slightly above the apex so as not to be subjected to possible sediment accumulation at the upstream base of the weir plate, the outlet level being taken into account in setting of the recorder pen, of course.

One or both of outer nuts 44 may be pinned or welded to the bolt at a separation corresponding to proper V-notch angle to assist in setting the angle correctly. Of course, the degree of expansion of the collar by the adjusting bolt is affected likewise in that event. A positive seal is assured, and minor wall irregularities are accommodated by resilient circumferential gasketing (not shown separately) of collar 30. A level indicator may be added to insure that the probe is installed with the V-notch oriented vertically. In all other respects, this probe may be installed and be removed just like the probe first described.

In general, stream flow over a weir plate varies in a known mathematical relationship with the height to which the weir lifts the stream. While accuracy is favored by upstream masurement and by lateral and vertical separation of the weir opening from the confines of the stream, the compact probe of the last views is a reasonably accurate and most convenient device. The sensed pressure is conveniently converted by the recorder (as through a suitably configured cam, if non-electrical, or through appropriate electrical circuitry) into the corresponding flow, rather than merely recording the depth. As in the instance of the first probe, this probe also may be used at a given site, and the flow be calibrated there by any proper method, whereupon a cam (or equivalent circuitry) can be constructed for the flow vs. sensed pressure at that site—for high accuracy. Especially when electrical conversion of depth to flow is employed a strain-gage or equivalent non-pneumatic differential-pressure sensing device may be substituted for the preferred bubbler.

The V-notch probe (51) is suitable when the conduit runs up to about half full, and the weir-less probe (11) when it runs higher than that, although either may be used through at least part of the rest of the flow range. Although conduits with round cross-sections are so common that no other shapes are illustrated, it will be understood that other conduit shapes may be accommodated, with corresponding change in configuration of the collar or equivalent support means. Application of an appropriate flow formula or construction of a suitable flow-characterizing element is well within the capability of persons ordinarily skilled in the art. Such persons are well qualified also to appreciate the numerous advantages and benefits of the invention, some of which have been mentioned above.

Notwithstanding the foregoing description and illustration of specific embodiments of the invention, some variations have been suggested above, and other modifications may be made therein, as by adding, combining, or subdividing parts or steps, without departing from the invention itself, which is defined in the following claims.

I claim:

1. In apparatus for monitoring flow in a conduit, the combination of support means configured to conform to the inside wall of the conduit and adapted to be compressed thereinto and to be expanded against the inside wall thereof, adjustment means for expanding the support means against the inside wall of the conduit, and flexible angle V-notch weir means supported by the support means.

2. Flow-monitoring apparatus according to claim 1, including a bubble tube as pressure sensing means supported by the support means along a conforming edge thereof and thereby adapted to lie adjacent the inside wall of the conduit.

3. Flow-monitoring apparatus according to claim 1, wherein the weir means comprises a V-notch plate having its apex supported adjacent the conforming edge of the support means and thereby adapted to be located adjacent the flow base in the conduit.

4. Flow-monitoring apparatus according to claim 3, wherein the top edges of the weir plate are supported adjacent the conforming edge of the support means and thereby adapted to be located adjacent the sidewalls of the conduit.

5. In apparatus for monitoring flow in a conduit, the combination of support means configured to conform to the inside wall of the conduit and adapted to be compressed thereinto and to be expanded against the inside wall thereof, adjustment means for expanding the support means against the inside wall of the conduit, and as weir means supported by the support means a V-notch plate having its apex supported adjacent the conforming edge of the support means and thereby adapted to be located adjacent the flow base in the conduit and comprising a pair of like pieces, each such piece being contiguous along one of its edges with the conforming edge of the support means, and both such pieces being contiguous with one another at one end of each, thereby forming the apex of the V-notch, the included angle at such apex being variable but adapted to be set by the adjustment means.

6. A probe insertable into an open end of a conduit for use in monitoring flow therein, comprising flexible collar means configured to conform to the inside wall of the conduit and adapted by reason of disjunction of its ends to be compressed and to be expanded, a flexible bubble tube supported by the collar means along the conforming edge thereof and thereby adapted to lie adjacent the inside wall of the conduit, and flexible apex V-notch weir means supported by the collar means.

7. A flow probe according to claim 6, wherein the apex of the V-notch is supported adjacent the conforming edge of the collar means and thereby is adapted to be located adjacent the flow base in the conduit, and top edges of the weir plate are also supported adjacent the conforming edge of the collar means and thereby are adapted to be located adjacent the sidewalls of the conduit.

8. Flow-monitoring apparatus comprising a flow probe according to claim 6, means for supplying fluid under pressure to the bubble tube, and pressure-sensing means interconnected to the bubble tube for sensing back pressure of an overlying flow stream in such conduit and adapted to convert the sensed pressure into flow of such stream.

* * * * *